(12) United States Patent
Chesser et al.

(10) Patent No.: US 7,837,153 B2
(45) Date of Patent: Nov. 23, 2010

(54) LOCAL OBSERVABLE AREA AND SELF INSPECTION SYSTEM

(75) Inventors: Douglas E. Chesser, Kula, HI (US); Timothy R. Kilgore, Orange, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 11/638,021

(22) Filed: Dec. 13, 2006

(65) Prior Publication Data

US 2010/0219297 A1  Sep. 2, 2010

(51) Int. Cl.
  *B64G 1/00* (2006.01)
(52) U.S. Cl. ............... 244/158.2; 244/172.5; 244/172.6
(58) Field of Classification Search ............... 244/158.2, 244/172.6, 173.3, 158.1, 172.4, 172.5, 171.1, 244/171.3, 1 TD
See application file for complete search history.

(56) References Cited

U.S. PATENT DOCUMENTS

| | | | | |
|---|---|---|---|---|
| 3,740,636 | A * | 6/1973 | Hogrefe et al. ............... | 320/101 |
| 6,410,897 | B1 * | 6/2002 | O'Neill ................... | 250/203.6 |
| 6,419,191 | B1 * | 7/2002 | Hoyt et al. ............... | 244/158.2 |
| 2005/0103940 | A1 * | 5/2005 | Bischof et al. ............... | 244/161 |

OTHER PUBLICATIONS

Orbiter Boom Sensor System (OBSS) document NASA—Shuttle in Shipshape: Part II Acessed on the Internet Aug. 29, 2008 through: http://web.archive.org/web/20050824091024/http://www.nasa.gov/returntoflight/system/rtfupgrades_partII.html.*
Webster's II Dictionary, Third Edition, 2005, Houghton Mifflin, Office Edition, pp. 272, 273, 499.*
"Laser applications", Wikipedia, Jan. 6, 2005, p. 4. Retrieved online from http://web.archive.org/web/20050111083321/http://en.wikipedia.org/wiki/Laser_applications on Feb. 27, 2009.*
"Laser rangefinder", Wikipedia, Nov. 1, 2005, p. 1. Previous revision of the article from 2005 retrieved online from http://en.wikipedia.org/w/index.php?title=Laser_rangefinder&oldid=27061537 on Feb. 27, 2009.*
MEPSI, http://space.skyrocket.de/doc_sdat/mepsi.htm.
Title: MEMS-Based PICOSAT Inspector (MEPSI) http://web.archive.org/web/20070127131554/http://www.darpa.mil/mto/mems/summaries/....
National Aeronautics and Space Administration, Space Test Program-H2-Microelectromechanical System-Based (MEMS) PICOSAT Inspector (STP-H2-MEPSI), Aug. 17, 2007 http://www.nasa.gov/missing_pages/station/science/experiments/STP-H2-MEPSI.html.

* cited by examiner

*Primary Examiner*—Tien Dinh
*Assistant Examiner*—Richard R Green
(74) *Attorney, Agent, or Firm*—Gates & Cooper LLP

(57) ABSTRACT

A surveying device and a method for surveying a satellite and its environs is disclosed. The surveying device comprises a docking platform having an interface for physically coupling to a surface of a bus of a spacecraft and an imaging module, releasably coupleable to the docking platform via a semi-rigid tether axially extendable and retractable by command, the imaging module having an imaging sensor for collecting image data, the imaging sensor communicatively coupled with the docking platform via the tether.

21 Claims, 8 Drawing Sheets

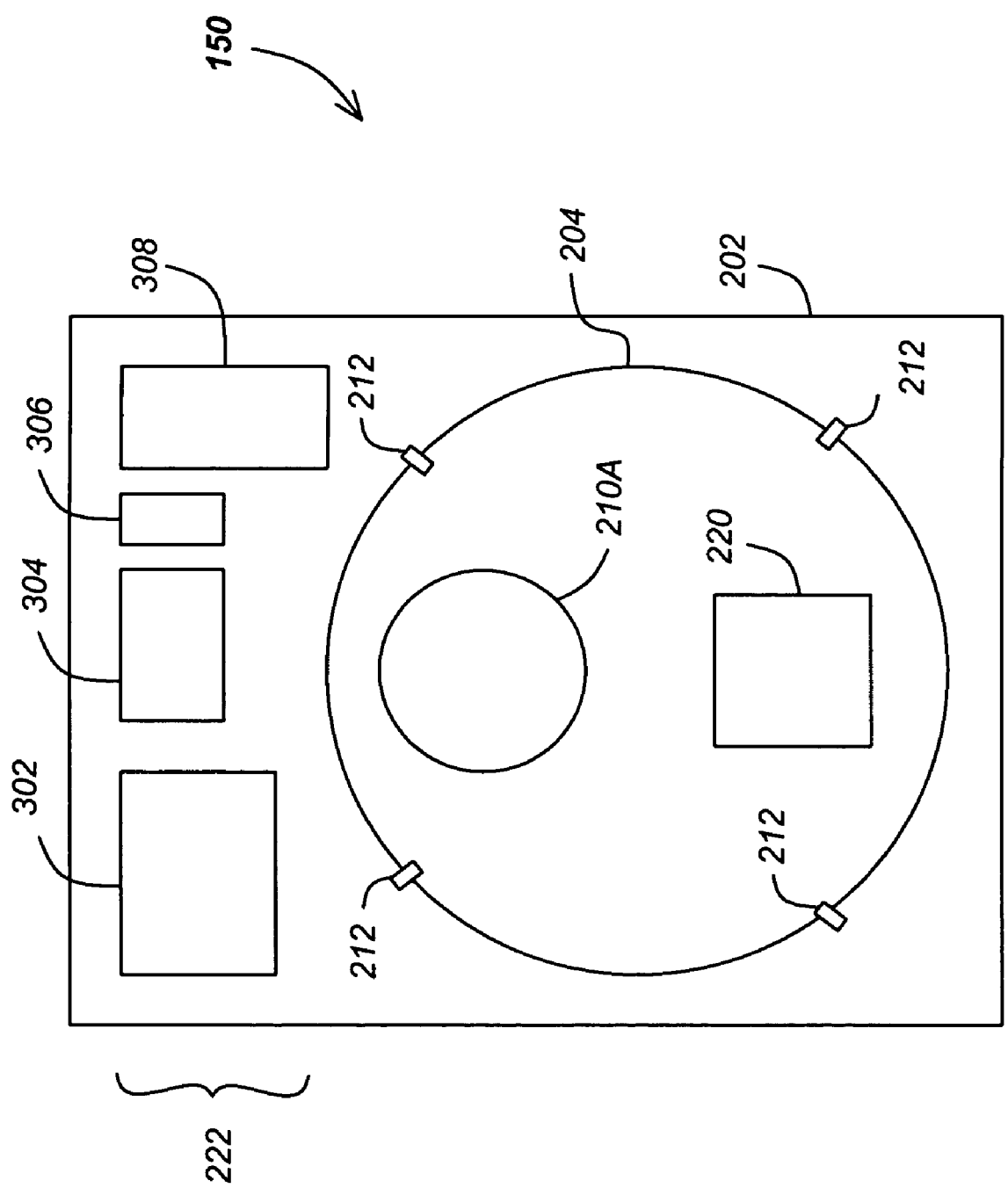

LOCAL OBSERVABLE AREA AND SELF INSPECTION SYSTEM

BACKGROUND OF THE INVENTION

1. Field of the Invention

The present invention relates to space surveillance, and in particular to an apparatus and method for locally generating imaging data of the vicinity of a spacecraft, including the spacecraft itself.

2. Description of the Related Art

The deployment of satellites and other assets in space offer the ability to quickly survey vast geographical areas and to provide secure worldwide communications. Such assets are highly valuable in times of conflict, but also present high-value targets to opponents, and can be vulnerable to countermeasures.

Such countermeasures include a wide variety of anti-satellite (ASAT) threats such as direct-ascent kinematic weapons (some including decoys to prevent countermeasures), ground and space-based energy weapons such as lasers, and stealthy satellite ASATs that are deployed nearby or on the target satellite without being detected, where they remain until the attack commences and they are activated.

To address such threats, it is important that such threats be detected and identified. This mission category is known as Space Situational Awareness/Space Object Identification (SSA/SOI). A key component of this mission has to do with detecting, identifying, and keeping track of closely spaced objects (CSOs).

Currently, space surveillance is accomplished via the space surveillance network (SSN). This is a worldwide conglomeration of a number of ground based radars and optical sensors which provide data that is post processed to produce ephemeris data for each of the space objects. Because the SSN uses large, ground based sensors that can scan only limited portions of the sky at any given time and because the data is post processed using techniques that are manually intensive, the SSN is quite expensive to operate. As a high value target in times of conflict, it is also of questionable survivability.

Currently, there are well over 2000 cataloged space objects, ranging in size from that of a small bolt to that of a small car. If a collision between any of these objects and a spacecraft should occur, catastrophic failure of the spacecraft would be the likely result. Further, in a time of conflict, it is likely that the amount of space debris will increase, and the additional objects may well overwhelm the current SSN. Further, since the cataloged objects are sensed from long distances (e.g. from Earth) smaller objects, which can still cause damage to satellites, are not known or cataloged. CSO identification can be improved with the use of large optical telescopes having adaptive optics, but such telescopes are expensive, operationally time consuming, and are currently only effective in discriminating objects that are low Earth orbit (LEO). It is difficult to discriminate CSOs in mid to high Earth orbits (e.g. geostationary and geosynchronous), even with such telescopes. Perhaps worse, these current systems are even less capable of identifying threats that have actually attached themselves to the target satellite.

Recognizing these limitations, plans are underway to deploy a space based surveillance system (SBSS) to perform some or all of the functionality currently provided by the SSN. However, although the SBSS should be capable of performing some of the SSA/SOI mission, that system is inherently limited in its ability to discriminate and identify CSOs by the virtue of the distance of its sensors from the CSOs themselves.

Accordingly, there is a need to provide a surveillance system that can perform the SSA/SOI mission more accurately, more quickly, more survivably, and at lower cost. The present invention satisfies that need.

SUMMARY OF THE INVENTION

To address the requirements described above, the present invention discloses a surveying device and a method for surveying a satellite and its environs. In an illustrated embodiment, the surveying device comprises a docking platform having an interface for physically coupling to a surface of a bus of a spacecraft and an imaging module, releasably coupleable to the docking platform via a semi-rigid tether axially extendable and retractable by command, the imaging module having an imaging sensor for collecting image data, the imaging sensor communicatively coupled with the docking platform via the tether. The method of surveying a satellite comprises deploying an imaging module from a docking platform via a semi rigid tether axially extendable and retractable by command, collecting image data of the satellite using at least one imaging sensor mounted on the imaging module; and transmitting the satellite image data to the satellite via the tether. The method of surveying the environs of a satellite comprises the steps of deploying at least one surveying device on an outer surface of a bus of the satellite and receiving the imaging data from the imaging module via the tether, wherein the surveying device comprises a docking platform having an interface for physically coupling to a surface of a bus of the satellite and an imaging module comprising an imaging sensor for collecting imaging data, the imaging module releasably deployable from a docking platform mounted on the satellite via a semi rigid tether axially extendable and retractable by command.

BRIEF DESCRIPTION OF THE DRAWINGS

Referring now to the drawings in which like reference numbers represent corresponding parts throughout:

FIG. 3 is a diagram illustrating an embodiment of the surveying device in the stowed state;

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
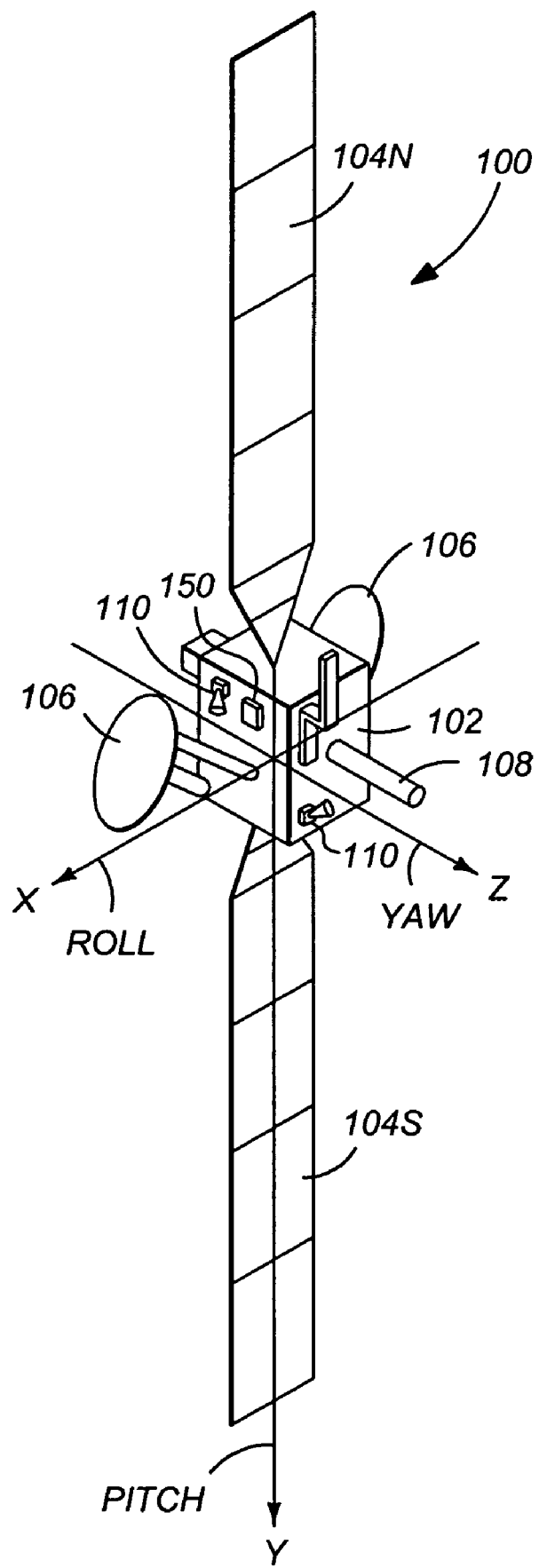
FIG. 1 illustrates a three-axis stabilized satellite or spacecraft.

FIG. 1 illustrates a three-axis stabilized satellite or spacecraft 100. The spacecraft 100 is preferably situated in a stationary orbit about the Earth. The satellite 100 has a main body or bus 102, a pair of solar panels 104, a pair of high gain narrow beam antennas 106, and a telemetry and command omni-directional antenna 108 which is aimed at a control ground station. The satellite 100 may also include one or more sensors 110 to measure the attitude of the satellite 100. These sensors may include sun sensors, earth sensors, and star sensors. Since the solar panels are often referred to by the designations "North" and "South", the solar panels in FIG. 1 are referred to by the numerals 104N and 104S for the "North" and "South" solar panels, respectively.

The three axes of the spacecraft 100 are shown in FIG. 1. The pitch axis P lies along the plane of the solar panels 140N and 140S. The roll axis R and yaw axis Y are perpendicular to the pitch axis P and lie in the directions and planes shown. The antenna 108 points to the Earth along the yaw axis Y.

As described above, the satellite 100 is subject to a wide variety of threats, and the ability to resolve and identify nearby CSOs, to perform self-inspection to determine if an ASAT weapon has attached itself to the satellite 100 and to determine how and where the satellite 100 might be damaged helps to minimize such threats. To accomplish this mission, one or more surveying devices 150 are deployed on an outer surface of the satellite bus 102. Additional surveying devices 150 may also be deployed on another surface of the satellite bus 102 to provide additional data useful in identifying and tracking nearby CSOs and for inspecting the satellite 102. Such additional surveying devices 150 may be positioned to provide a stereo view of some of the threats for increased resolution and more rapid orbit/trajectory determination, or may be positioned on an opposite side from the first surveying device 150 or on multiple sides so as to provide complete surveillance coverage around the satellite 100.

Figure 2:
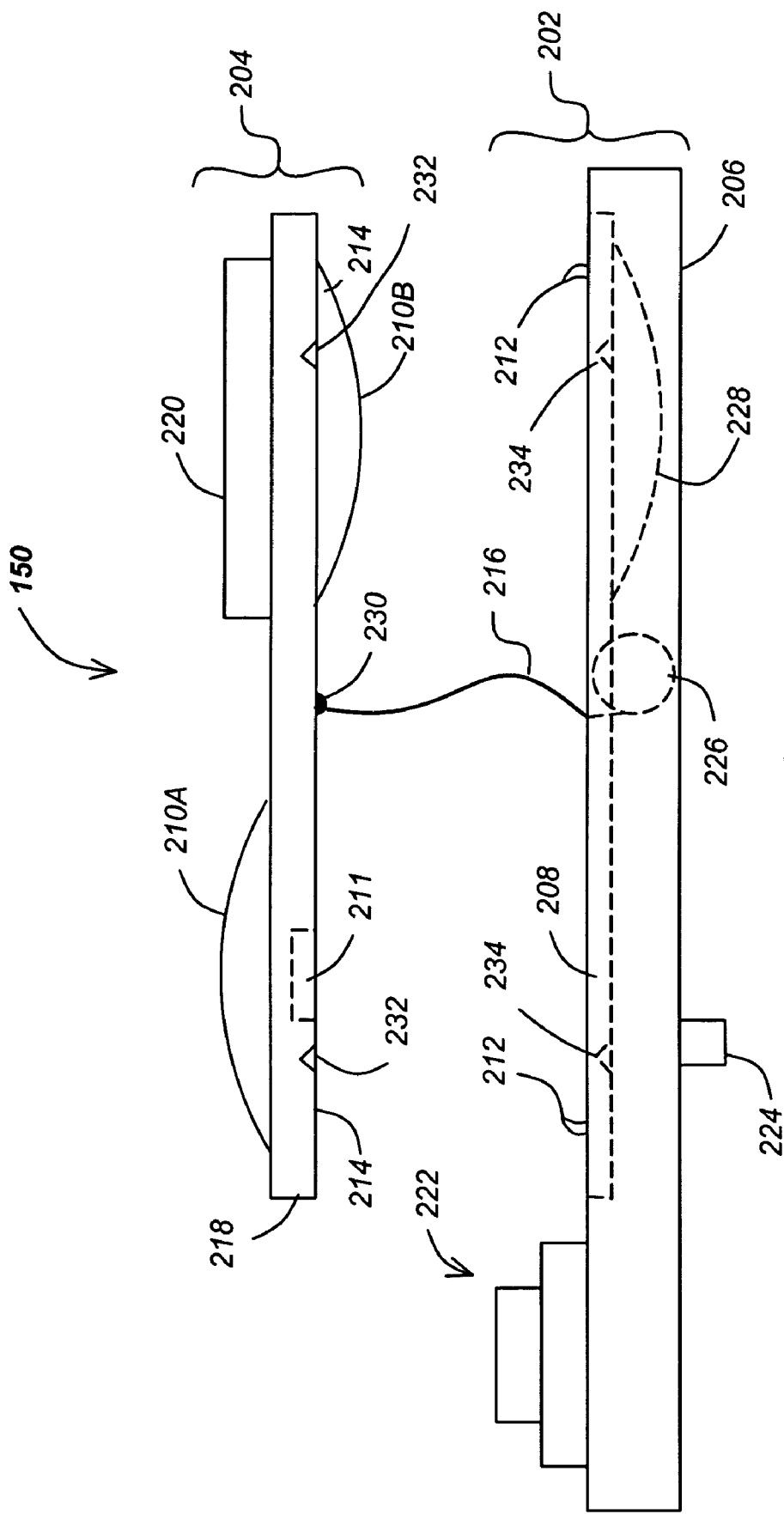
FIG. 2 is a diagram of one embodiment of the surveying device.

FIG. 2 is a diagram of one embodiment of the surveying device 150. The surveying device 150 comprises a docking platform 202 that is releasably coupleable and re-coupleable to an imaging module 204 via the extension and retraction of a tether 216.

The docking platform 202 includes a housing 206, spacecraft interface 224, a physical interface portion comprising structures 208, 212, 228, and 234, and an electronics portion 222.

The spacecraft interface 224 provides for physical coupling to a surface of the spacecraft bus 102 and also provides for a communications interface between the satellite 100 and the surveying device 150. In one embodiment, the communications between the surveying device 150 and the satellite 100 is accomplished via a serial or parallel interface comprising a plurality of conductors. However, communications can also be accomplished via wireless transmission, using radio frequency or optical energy to transmit and receive information. Also, while the interface 224 is illustrated as protruding from the surface of the satellite 100, this need not be the case, as the interface may be flush with the surface of the surveying device 150.

The surveying device can be operated in a stowed state or a deployed state. In the stowed state, the imaging module 204 is rigidly coupled to the docking platform 202, with a first imaging sensor 210A facing away from the satellite 100. In the deployed state, the imaging module 204 is compliantly coupled to the docking platform 202 and hence, the first imaging sensor 210A can collect image data and information in one direction, and a second imaging sensor 210B can collect image data and information from the opposing direction. The second imaging sensor 210B therefore can be used to observe the docking platform 202 and the satellite 100 itself. The image sensor(s) 210 can be visible light, infrared, or UV sensors, as requirements dictate, and each of the sensors 210A and 210B can be sensitive to different wavelengths. In the preferred embodiment, the image sensors are wide field of view (WFOV) staring visible light sensors.

The physical interface portion comprises a mating surface such as a cavity 208 having a size and shape complementary to that of the surface of the imaging module 204 facing the docking platform 202. In the illustrated embodiment, the cavity 208 also comprises a depression sized and shaped to accept a second imaging sensor 210B when the imaging module 204 is in the stowed state and hence coupled to the platform 202. While in the stowed state, the imaging module 204 may also be securely held to the docking platform 202 using latches 212 or similar devices. Proper orientation of the imaging module 204 within the cavity 208 can be assured by interaction of mounting appendages 232 on the imaging module 204 with complementary shaped kinematic mounts 234 on the docking platform 202.

When in a deployed state, the imaging module 204 is released from the docking platform 202, but flexibly held in the vicinity of the docking platform 202 by the semi-rigid tether 216. In the illustrated embodiment, the tether 216 is a flexible, semi-rigid member that is axially extendable and retractable from a tether controller 226 (e.g. it is extended along its longitudinal axis), upon a command from the spacecraft 100 from the surveying device 150 to suspend the imaging module 204 at varying distances and at varying angles from the docking platform 202. In one embodiment, the tether controller 226 is simply a motor driven element of cylindrical shape over which the tether 216 is wrapped during deployment and unwrapped when deployed. In another embodiment, the controller 226 includes a feeder assembly that can be used to control the flexure angle of the semi-rigid tether such that the curve angle of the deployed tether can be controlled. This allows the line of sight pointing of the imaging module to be varied to a degree while in the self-inspection mode. Although the tether 216 is illustrated as a flexible, semi-rigid member, it may also be comprise a folding member having joints that permit movement of the imaging module 204 away from the docking platform 202.

The tether 216 is affixed to the imaging module 204 by anchor 230. In one embodiment, the anchor 230 is a motor-driven rotatable joint that permits the imaging module to be rotated by the plane of the paper and/or the plane of the imaging module 204 by command, and may also be rotatable in multiple directions, permitting the imaging module 204 to rotate within a plane perpendicular to the paper. In a simplified embodiment, tether 216 has a curvilinear shape and the anchor 230 is sufficiently rigid so that the imaging module is disposed at varying angles to the docking station 202 as the tether 216 is deployed from the docking platform 202. This allows the imaging module 204 to be used to collect imaging data at different angles. This embodiment is discussed further below.

Figure 4A:
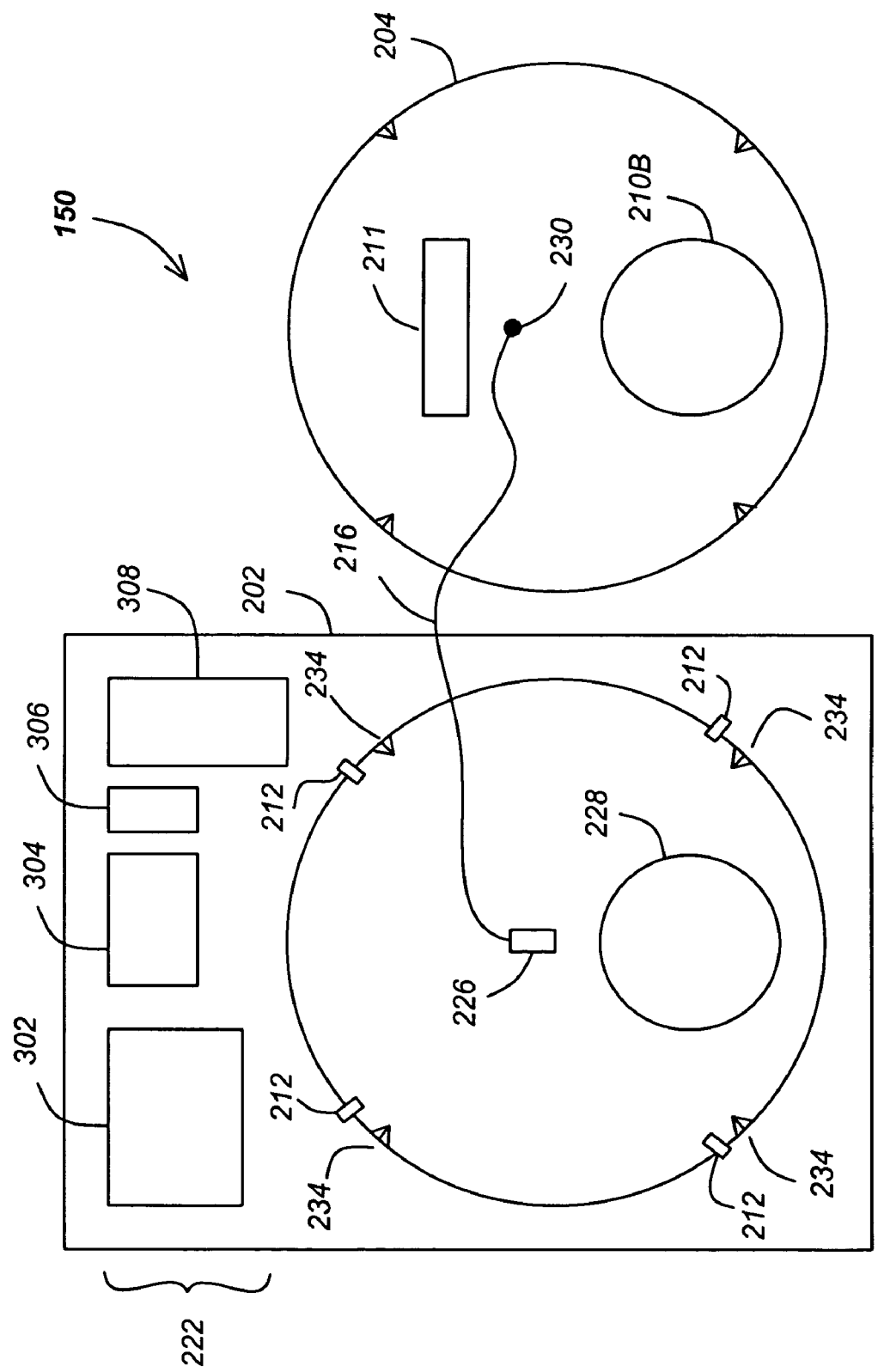
FIG. 4A is a diagram of an embodiment of the surveying device showing the imaging module separated from the docking station.
Figure 4B:
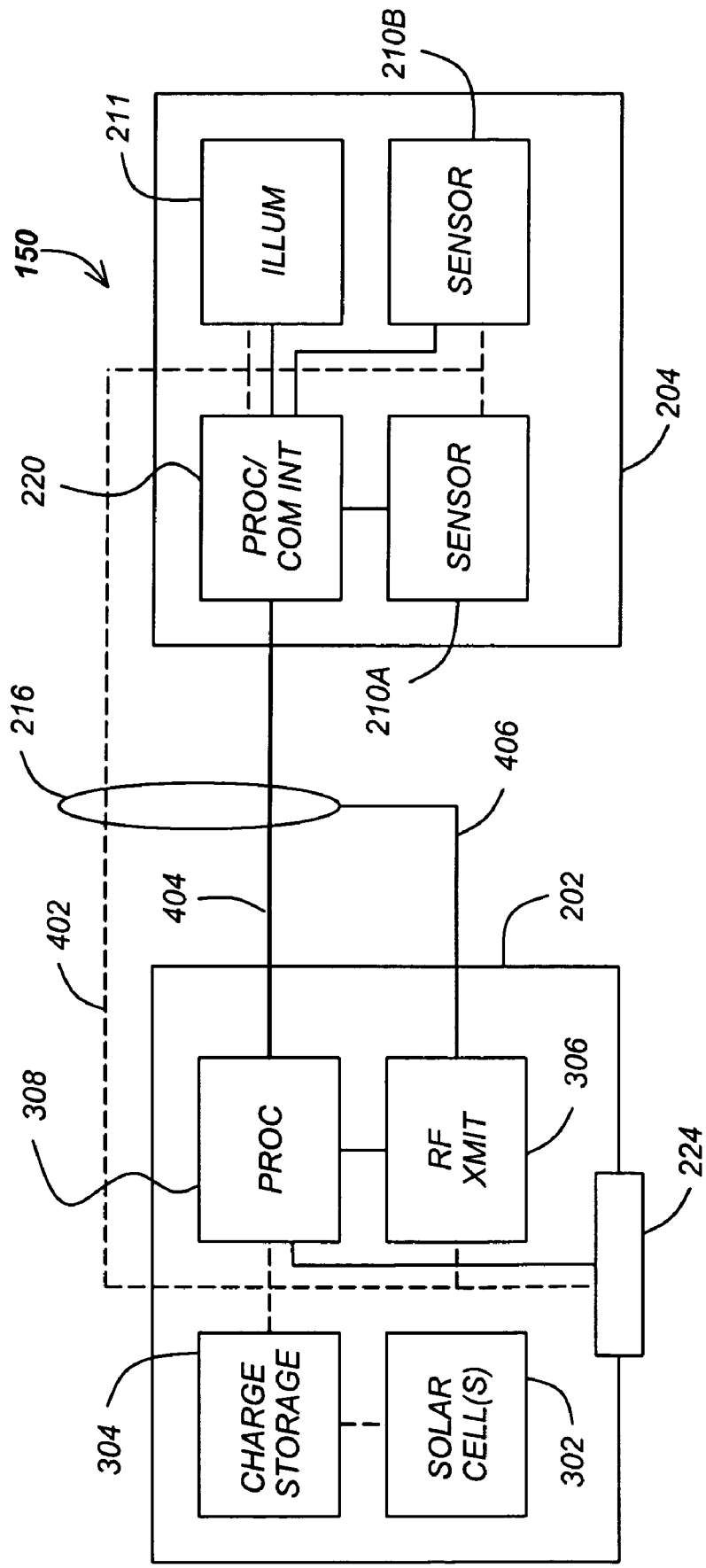
FIG. 4B is a diagram presenting a block diagram of the functional elements of the surveying device.

FIG. 3 is a diagram illustrating an embodiment of the surveying device 150 in the stowed state. In this state, the imaging module 204 is disposed into the cavity 208 in a position determined by the kinematic mounts 234 and mounting appendages 232, and held in place by latches 212. FIG. 3 also illustrates additional details regarding the electronics portion 222, which is described with respect to FIGS. 4A-4B below FIG. 4A is a diagram of an embodiment of the surveying device 150 showing the imaging module 204 separated from the docking station 202. FIG. 4B is a diagram presenting a block diagram of the functional elements of the surveying device 150.

Typically, power is provided to the surveying device 150 via interface 224, which includes a conductor that carries power to the surveying device 150. Such power is distributed to the surveying device 150 modules by power distribution conductor(s) 402. However, a satellite subsystem failure may cause an interruption or compromise of this power service. Hence, the surveying device 150 includes its own power supply system that allows it to operate autonomously from power sources aboard the satellite 100. The power supply system includes one or more solar cells 302 that are coupled to a charge storage device 304 such as a battery or a capacitor of sufficient storage capacity, and conductors 402 that connect the charge storage device 304 with the appropriate modules. The solar cells 302 continually charge the charge storage device 304, and when power to the surveying device 150 is interrupted, power is supplied by the charge storage device 304. The solar cells 302 continue to provide replacement charge to the charge storage device 304 while it is in use. In embodiments where the interface 224 does not comprise a conductive element (e.g. where data and commands are passed between the surveying device 150 and the satellite 100 by a wireless link, the solar cells 302 are sized to generate sufficient charge to operate the surveying device autonomously.

The electronics portion 222 also includes a processor 308 having an associated memory for storing data and processor instructions, and a transmitter 306. The processor 308 performs the functions associated with the surveying device 150, including commanding the extension and retraction of the tether 216, the illumination of the light source 211, and the collection and reduction of data provided by the imaging sensors 210. The processor 308 may perform these functions autonomously in the event of a satellite 100 malfunction, or may perform these functions under direction of one or more processors in the satellite 100.

The processor is communicatively coupled with the satellite 100 via interface 224 and with the imaging module 204 via a communication link 404 in the tether 216, and performs the operations required to collect and process the imaging data. The transmitter 306 is communicatively coupled to the processor 308 and to the tether 216 via link 406. The transmitter 306 accepts imaging data from the processor 308 and using the tether 216 as an antenna, transmits that data either to the host satellite 100 or to one or more ground stations should the satellite fail. Using a low power RF transmitter and a simple antenna formed by the tether 216, it is possible to transmit (albeit, at a much lower rate than is possible with more highly directive antennas and higher power transmitters on board the satellite) image data to a remote ground stations. It is also noted that the transmission of information to a ground station can be accomplished by appropriate modulation or flashing of the light source 211.

The imaging module 204 comprises a processing/interface module 220 that is communicatively coupled to the docking station processor 308 via link 404 of the tether 216. This module might include a processor that is capable of performing complex image processing or preprocessing before on images generated by the sensors 210 or a simple communication interface without processing capability.

The imaging module 204 also comprises a first imaging sensor 210A and a second imaging sensor 210B, both communicatively coupled to the processing/interface module 408 and to the processor 308. The imaging sensors 210 collect image data in the appropriate wavelengths and over the field of views of interest. In one embodiment, the sensors are wide field of view (WFOV) staring sensors sensitive to visible light, however, the sensors can be sensitive to other wavelengths as well, or be designed to operate exclusively in other wavelengths. For example, in one embodiment, the second imaging sensor 210B that is also sensitive to infrared wavelengths. Although not necessary, the FOV of the first imaging sensor 210A will typically be different than that of the second imaging sensor 210B, because the primary mission of the first imaging sensor 210A is to detect, discriminate, and identify CSOs that are nearby the host satellite 100, while the primary mission of the second imaging sensor 210B is to image the host satellite itself. These missions call for different FOV, resolution, update rate, and sensitivity requirements, and those differences are reflected in the choice of the arrays used in these sensors, and the optical systems the arrays operate with.

The processing/interface module 220 is also communicatively coupled to an illuminator 211. The illuminator 211 is a source of energy at the wavelengths to which the second sensor 210B is sensitive. In one embodiment, the second imaging sensor 210B is a visible light sensor, and the illuminator is a light source such as a visible light emitting diode (LED) or flash. The illuminator may also operate at other wavebands to which the second imaging sensor 210B is sensitive. For example, in addition to or instead of the visible LED, the illuminator 211 may comprise an IR LED. The illuminator can be controlled by the processing/interface module 220 or the processor 308 in the docking platform to emit light at the appropriate time.

Figure 5C:
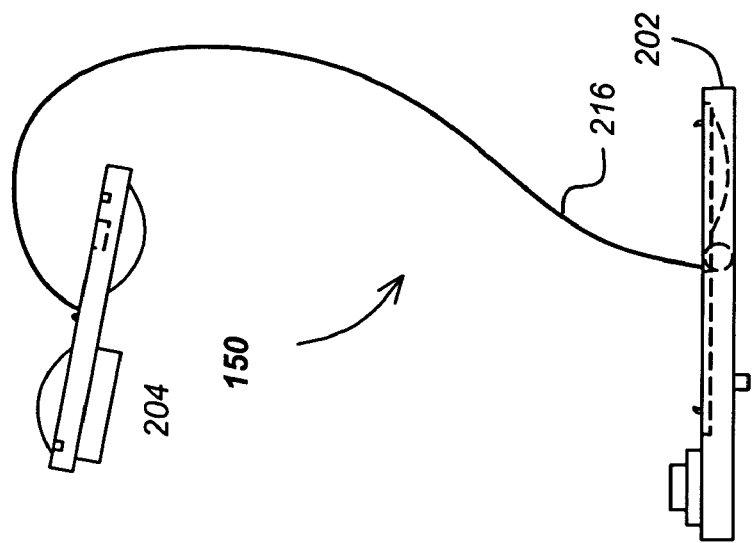
FIGS. 5A-5C are diagrams showing the deployment of the imaging module from the docking module.
Figure 5B:
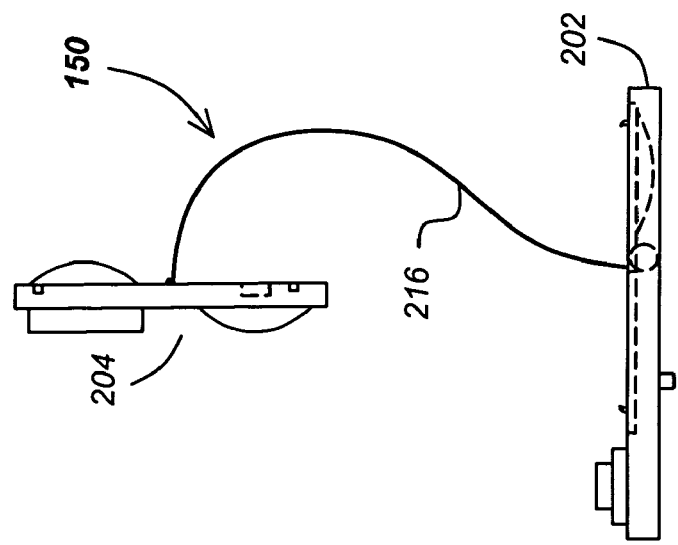
Figure 5A:
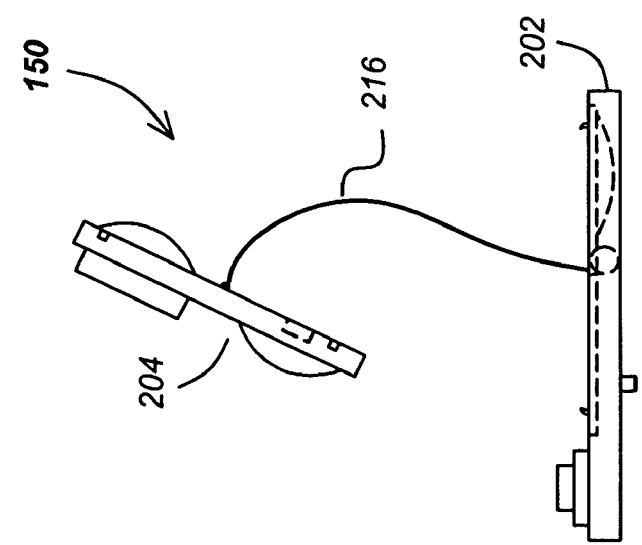

FIGS. 5A-5C are diagrams showing the deployment of the imaging module 204 from the docking module 202. In this embodiment, the semi-rigid tether 216 is shaped similarly to a question mark (?) so that in the process of being deployed, the imaging module 204 is oriented at varying (and in the illustrated embodiment, increasing) angles as the tether is extended. In this embodiment, it is possible to perform both space surveillance of nearby CSOs and perform self-inspection of the host satellite 100 using only a single sensor. Hence, although the preferred embodiment includes two sensors mounted on opposite sides of the imaging module, other embodiments are envisioned as well.

Figure 6:
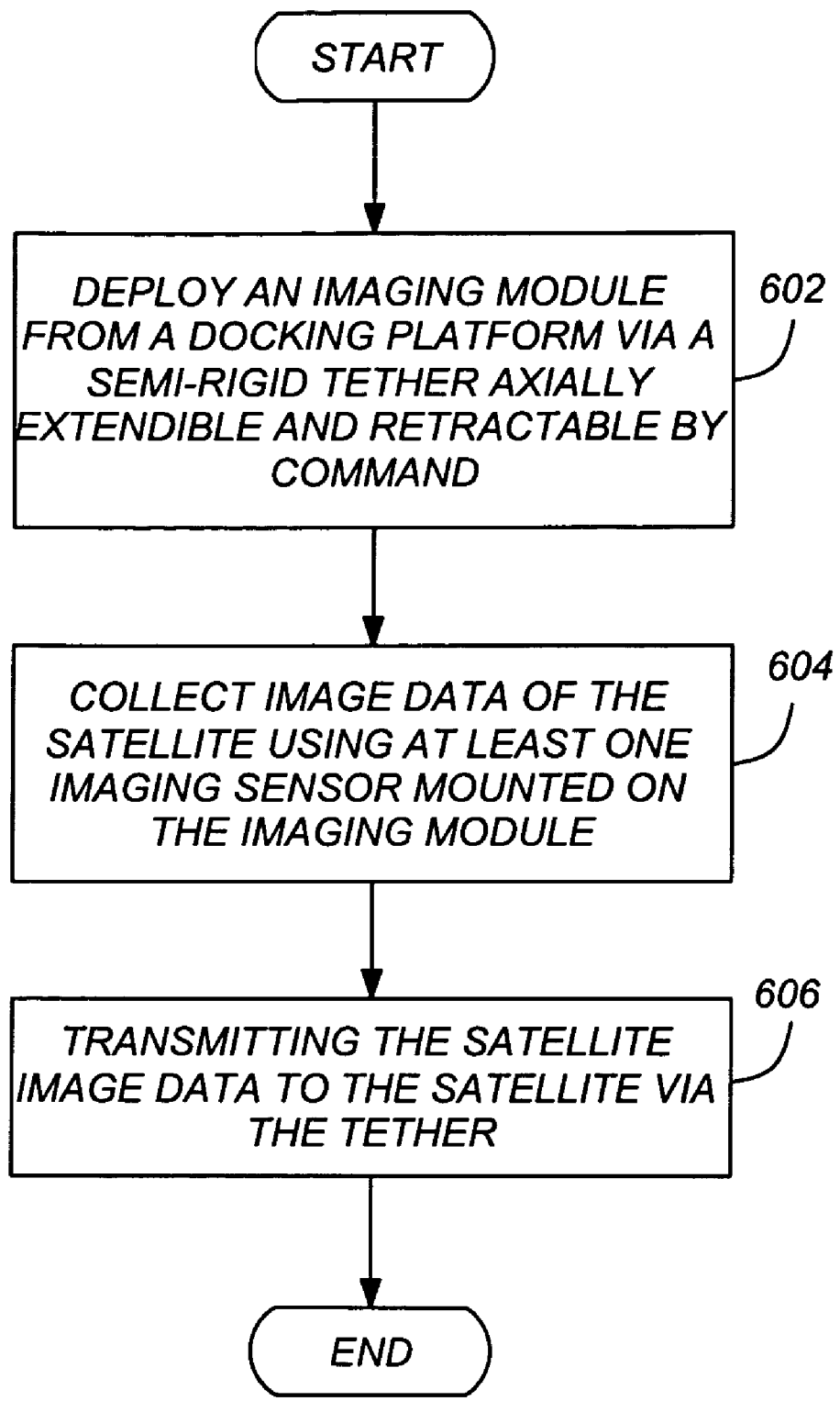
FIG. 6 is a flow chart illustrating representative method steps that can be used to practice one embodiment of the invention.

FIG. 6 is a flow chart illustrating representative method steps that can be used to practice one embodiment of the invention. An imaging module 204 is deployed from a docking platform via a semi-rigid tether axially extendable and retractable by command, as shown in block 602. Image data of the satellite is then collected using at least one of the imaging sensors 210 mounted in the imaging module 204. The satellite image data is then transmitted to the satellite 100 or to a ground station via the tether 216. That is, the data may be transmitted from the imaging module 204 to the docking module 202 via the tether 216 and thence to the satellite by via interface 224 or wirelessly, using the tether 216 as an antenna.

Figure 7:
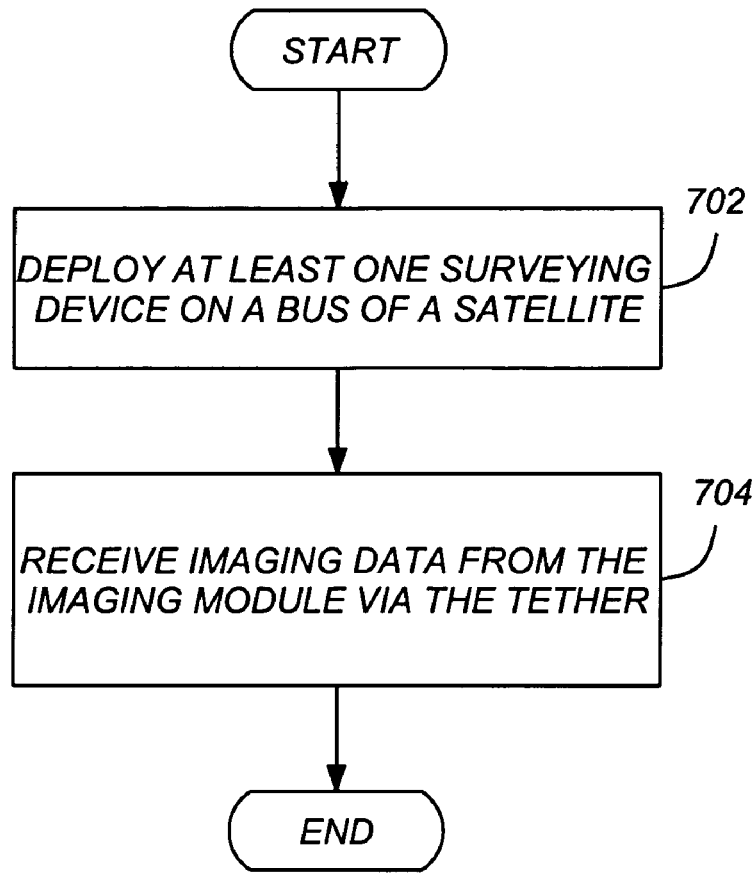
FIG. 7 is a flow chart illustrating representative method steps that can be used to practice another embodiment of the present invention.

FIG. 7 is a flow chart illustrating representative method steps that can be used to practice another embodiment of the present invention. In this embodiment, the survey device 150 is used to image objects in the vicinity of the satellite 100 rather than the satellite 100 itself. The surveying device 150 is deployed on a bus of a satellite 100, as shown in block 702. Imaging data is received from the imaging module 204 via the tether 215, as shown in block 704.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A space-based surveying device, comprising:
    a docking platform having an interface for physically coupling to a surface of a bus of a spacecraft;
    an imaging module, releasably coupleable to the docking platform; and
    a semi-rigid tether, coupled to the docking platform and the imaging module, the semi-rigid tether axially extendable and retractable by command, the imaging module having a first imaging sensor for collecting image data, the imaging sensor communicatively coupled with the docking platform via the tether, wherein the semi-rigid tether has a curvilinear shape configured to dispose the imaging module at varying angles to the docking platform as the tether is deployed;
    wherein the surveying device is operable in a stowed state in which the imaging module is rigidly coupled to the docking station, and a deployed state in which the imaging module is compliantly coupled to the docking station.

2. The device of claim 1, wherein:
    the first imaging sensor is disposed on a side of the imaging module facing away from the spacecraft when the imaging module is rigidly coupled to the docking platform.

3. The device of claim 1, wherein the imaging module is rigidly recoupleable to the docking station via retraction of the tether.

4. The device of claim 1, wherein:
    the imaging module further comprises a second imaging sensor disposed on a reverse side of the imaging module from the first imaging sensor, the second imaging sensor for collecting image data from a direction opposing the first imaging sensor to inspect the spacecraft when the semi-rigid tether is extended.

5. The device of claim 4, wherein the first imaging sensor and the second imaging sensor are visible light sensors.

6. The device of claim 5, wherein the imaging module further comprises a light source, disposed on the same side of the imaging module as the second imaging sensor, the light source for providing illumination in wavebands to which the second imaging sensor is sensitive.

7. The device of claim 6, wherein the light source is a flash.

8. The device of claim 4, wherein the first sensor and the second sensor are a wide field of view (WFOV) visible sensors.

9. The device of claim 8, wherein the WFOV visible sensors are staring sensors.

10. The device of claim 1, wherein the shape of the tether is curved in a question mark shape.

11. The device of claim 1, wherein:
    the tether comprises conductive material, thereby forming an integral antenna; and
    the docking platform further comprises a radio frequency (RF) transmitter communicatively coupled to the integral antenna, the RF transmitter and integral antenna for transmitting data to a ground station via the tether if a communications system of the spacecraft is not operational.

12. The device of claim 1, wherein the docking platform further comprising a battery backup module, continuously charged by a solar cell.

13. The device of claim 1, wherein the docking platform comprises kinematic mounts for releasably gripping the imaging module in the stowed state.

14. A method of performing self inspection of a satellite, comprising the steps of:
    deploying an imaging module from a docking platform mounted on the satellite via a semi rigid tether axially extendable and retractable by command, wherein the semi-rigid tether has a curvilinear shape configured to dispose the imaging module at varying angles to the docking platform as the tether is deployed;
    collecting image data of the satellite using at least one imaging sensor mounted on the imaging module; and
    transmitting the satellite image data to the satellite via the tether.

15. The method of claim 14, wherein:
    the step of collecting image data of the satellite is performed while deploying the tether.

16. The method of claim 14, further comprising the step of illuminating the satellite with a light source disposed on the imaging module while collecting image data of the satellite.

17. The method of claim 14, wherein the at least one imaging sensor is a staring wide field of view sensor.

18. The method of claim 14, wherein:
    the tether comprises a conductor coupled to a radio frequency (RF) transmitter in the docking platform and to the imaging sensor, the conductor providing a wired path between the imaging sensor and the RF transmitter and providing an antenna for the RF transmitter; and
    the step of transmitting the satellite image data to the satellite via the tether comprises the steps of
        transmitting the satellite image data to the RF transmitter via the conductor; and
        wirelessly transmitting the satellite image data from the RF transmitter to the satellite via the antenna.

19. The method of claim 14, wherein:
    the satellite comprises a satellite communication system for transmitting data to a ground station;
    the tether comprises a conductor coupled to an RF transmitter in the docking platform and to the imaging sensor, the conductor providing a wired path from the imaging sensor and the RF transmitter and an antenna for the RF transmitter; and
    the step of transmitting the satellite image data to the satellite via the tether comprises the steps of
        transmitting the satellite image data to the RF transmitter via the conductor;
        wirelessly transmitting the satellite image data from the RF transmitter to the a ground station via the antenna if the satellite communication system is not operational.

20. A method of detecting objects in a vicinity of a satellite, comprising the steps of:
    deploying at least one surveying device on an outer surface of a bus of the satellite, the surveying device comprising:

a docking platform having an interface for physically coupling to a surface of a bus of the satellite;

an imaging module comprising an imaging sensor for collecting imaging data, the imaging module releasably deployable from the docking platform mounted on the satellite;

a semi rigid tether, coupled to the docking platform and the imaging module, the semi-rigid tether axially extendable and retractable by command, wherein the semi-rigid tether has a curvilinear shape configured to dispose the imaging module at varying angles to the docking platform as the tether is deployed; and receiving the imaging data from the imaging module via the tether.

21. The method of claim 20, wherein the tether comprises conductive material, thereby forming an integral antenna; and the docking platform further comprises a radio frequency (RF) transmitter communicatively coupled to the integral antenna, the RF transmitter and integral antenna for transmitting data to a ground station via the tether if a communications system of the satellite is not operational.

* * * * *